US007208060B2

(12) United States Patent
Conzone et al.

(10) Patent No.: US 7,208,060 B2
(45) Date of Patent: *Apr. 24, 2007

(54) LOW TEMPERATURE JOINING OF PHOSPHATE GLASS

(75) Inventors: Samuel David Conzone, Clarks Summit, PA (US); Joseph S. Hayden, Clarks Summit, PA (US); Alexander J. Marker, III, Moscow, PA (US)

(73) Assignee: Schott, AG, Mainz (DE)

( * ) Notice: Subject to any disclaimer, the term of this patent is extended or adjusted under 35 U.S.C. 154(b) by 97 days.

This patent is subject to a terminal disclaimer.

(21) Appl. No.: 10/614,087

(22) Filed: Jul. 8, 2003

(65) Prior Publication Data

US 2004/0106018 A1   Jun. 3, 2004

Related U.S. Application Data

(63) Continuation of application No. 09/430,885, filed on Nov. 1, 1999, now Pat. No. 6,652,972.

(51) Int. Cl.
*B32B 37/12* (2006.01)

(52) U.S. Cl. .......................... 156/99; 156/285; 156/286

(58) Field of Classification Search .................. 156/99, 156/106, 285–286; 428/426, 428, 432, 688–689, 428/697, 702, 704; 427/164–165
See application file for complete search history.

(56) References Cited

U.S. PATENT DOCUMENTS 3,965,057 A * 6/1976 Ammons et al. ........... 428/339

| 4,018,616 | A | * | 4/1977 | Sugahara et al. | ........... 106/629 |
| 4,026,714 | A | * | 5/1977 | Lewis | .......................... 501/47 |
| 4,173,668 | A | * | 11/1979 | Hentzelt et al. | ............... 428/34 |
| 5,543,230 | A | * | 8/1996 | von Bonin et al. | ......... 428/432 |
| 6,280,547 | B1 | * | 8/2001 | Balduin et al. | ............. 156/104 |

FOREIGN PATENT DOCUMENTS

JP          52-44834          *  4/1977
WO          WO 98/42504       * 10/1998

* cited by examiner

*Primary Examiner*—Jessica Rossi
(74) *Attorney, Agent, or Firm*—Millen, White, Zelano, Branigan, P.C.

(57) ABSTRACT

A method for the low temperature joining of similar and/or different phosphate glass by mating at low temperature glass components by an aqueous solution containing phosphorus. In preferred embodiments, the phosphate glasses are polished, cleaned, and brought together with the phosphate-containing solution between the polished surfaces. Vacuum may be applied to assist in making the joint. The composite is optionally heat treated to increase strength, chemical durability, and optical performance. The bond thereby formed has low birefringence, is strong, and is virtually photonically invisible. The joints now make possible, for example, substrates for virtually no loss signal splitters and other high-end optical components at low cost. Large hybrid performs substrates composed of multiple glass components may be prepared and segmented, providing an inexpensive novel substrate for the photonics industry. Active lasing phosphate glasses may be joined by the present invention method to passive non-lasing glasses for use in laser and related applications.

11 Claims, 6 Drawing Sheets

LOW TEMPERATURE JOINING OF PHOSPHATE GLASS

This application is a continuation application of U.S. patent application Ser. No. 09/430,885, filed Nov. 1, 1999, now U.S. Pat. No. 6,652,972, and hereby claims priority thereto.

BACKGROUND OF THE INVENTION

The present invention relates to a process and method for the joining of glass, particularly phosphate glass, using a solution at low, e.g. room temperature or temperatures below the glass transition point of the glasses to be joined. The present invention also relates to joined phosphate glasses, a solution for the bonding of phosphate glasses, and methods of employing joined phosphate glass (e.g. hybid or similar glass joints) in photonic applications, especially in laser and related applications.

Bonded glass is well known in the manufacture of various light transmitters, refractors, reflectors, and the like. Optical clarity, e.g. low loss at the bonded zone, is of high importance in various applications and various high temperature methods to obtain as high a quality joint as possible are known. High performance instruments or devices, especially optical devices, require a quality bonded joint to prevent optical loss.

For a bond's quality to be ascertained, factors such as the precision of the bond, the bond's mechanical strength, the bond's optical, thermal, and chemical properties, as well as the simplicity of the bonding process are considered.

SUMMARY OF THE INVENTION

The present application relates to a glass composite formed from a first phosphate glass surface and a second phosphate glass surface, the composite having in between and in contact with each surface, a phosphorous-containing solution. In a preferred embodiment, the composite is formed from a first and second phosphate glass interface having in between and in contact with said interface a layer of cured phosphorus-containing aqueous solution. In yet another embodiment, the layer is a condensed phosphorus phase (e.g. a $(P\text{—}O\text{—}P)_n$ layer). The composites according to the present invention are preferably prepared by joining two phosphate glass substrates together by curing therebetween a phosphorus containing aqueous solution. The method according to the present invention includes bonding two phosphate glass surfaces by curing therebetween a phosphorus-containing aqueous solution. Hybrid glass joints according to the present invention find use in photonic devices including a phosphate glass component therein, such as laser sources, lossless splitters, etc...

A phosphate glass as used within this application means a glass where $P_2O_5$ is the primary glass forming component present, although other glass forming components $SiO_2$, $GeO_2$, $P_2O_3$ or conventional modifiers (e.g. $Na_2O$, $K_2O$) and intermediates (e.g. $Al_2O_3$) may be present in lesser quantity.

A phosphorous-containing solution as used within this application is to be construed as broadly encompassing suitable soluble phosphorous, e.g. phosphates, phosphites, and related phosphorous-containing species.

An object of the present invention is to provide a method for joining glass components at low temperature using a solution based technology.

An additional object of the invention is to provide enhanced structured phosphate glass composites without heat related defects (e.g. surface crystallization or warping).

An additional object of the invention is to provide an optically transparent phosphate glass composite.

An additional object of the invention is to provide an aqueous, phosphorus-containing solution as an adhesive for preparing mechanically strong and optically transparent joints between phosphate glasses.

An additional object of the invention is to provide improved hybrid photonic devices where active (lasing) phosphate glasses are joined to other active or passive (non-lasing) phosphate glasses.

An additional object of the invention is to provide acidic or basic phosphorus-containing solutions as adhesives for phosphate glass joining.

An additional object of this invention is to provide a method whereby an aqueous phosphorus-containing solution is used to form an optically transparent and mechanically strong joint between phosphate glasses at low temperature—below the lowest glass transition temperature of the two glasses being joined.

An additional object of the present invention is to provide a method to form hybrid photonic devices, which contain various phosphate glass components joined in such a way that they are optically transparent.

A further object of the instant invention is to provide a method for joining phosphate glasses joined at room temperature by dissolution and condensation reactions.

A further object of the instant invention is to provide a composite glass with minimal defects caused by differences in the coefficient of thermal expansion of the components since they are joined at low temperatures.

A further object of the instant invention is to provide a process for the preparation of composite phosphate glass wherein the glass does not necessarily have to be ramped or quenched through any temperature range to form a rigid joint.

An additional object of the present invention is to provide a joining adhesive solution (e.g. the phosphorus-containing solution used to join the phosphate glasses) which is chemically similar to the glass.

A further object of the instant invention is to provide a phosphate glass to phosphate glass interface with low turbidity, and a transparent interface.

An additional object of the instant invention is to provide a composite glass joint which is optically transparent at the wavelengths commonly used for photonic systems utilizing wavelengths from 800 to 2500 nm.

An additional object of the instant invention is to provide a joined or bonded phosphate glass joint which is made at low (e.g. room) temperature and has sufficient mechanical strength to survive oil-based cutting, grinding and polishing.

An additional object of the instant invention is to provide a joined or bonded phosphate glass joint which is made at low (e.g. 25° C.) temperature and has sufficient mechanical strength to survive water-based cutting, grinding and polishing after a heat treatment.

Finally, an additional object of the present invention is to provide a phosphate glass surface joint with no appreciable strain or birefringence around the interface.

Other objects, features, and characteristics of the present invention as well as the methods of use of related elements will become more apparent upon consideration of the following description and the appended claims with reference to the accompanying drawings, wherein like reference numbers designate corresponding elements in the various figures.

Figure 1:
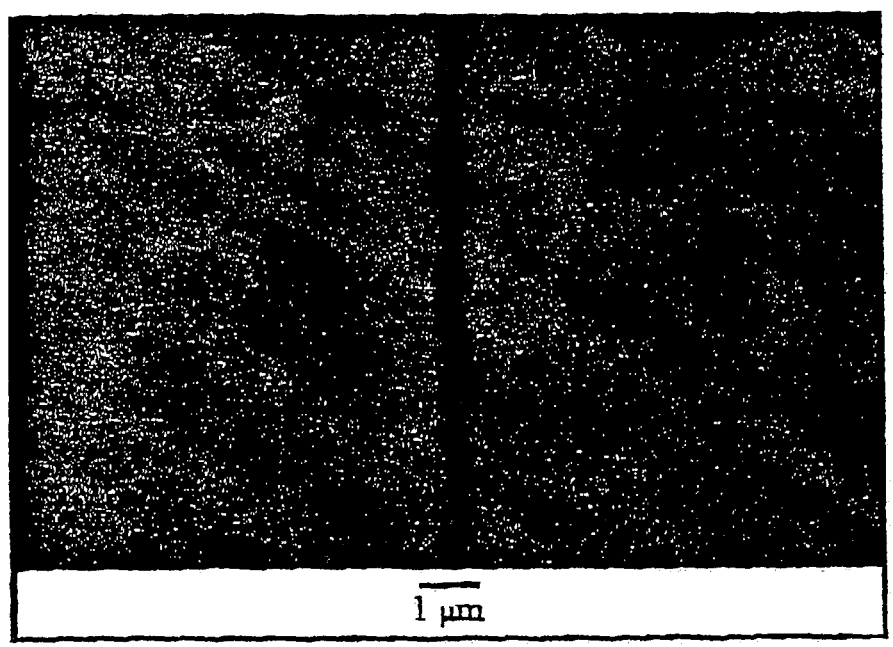
FIG. 1 is a scanning electron microscopy image of a typical joint interface prepared by joining two phosphate glasses according to the present invention

In one embodiment, a phosphorus-containing solution is sandwiched between two phosphate glasses at low temperature, thereby forming a joint or bond between the phosphate glasses. Preferably this is achieved at room temperature, or at a temperature below the glass transition temperature. Such a joint provides a strong, optically transparent joint.

A joined glass according to a preferred embodiment of the present invention comprises one which appears optically transparent, is strong enough that it cannot be broken by hand, and is not fractured when a component piece is cut from the formed template (oil or water based cutting) and finished (e.g by grinding and polishing). Component pieces may be thin slices on the order of 2 mm thick from a much larger hybrid glass preform.

A joined glass according to another preferred embodiment of the present invention comprises one which appears optically transparent, is strong enough that it cannot be broken by hand, and, after heat treatment or vacuum dessication is not fractured after water based cutting, grinding and polishing.

To prepare a composite glass according to the present invention, appropriate substrate glasses are first obtained. Such glasses may be prepared by any method whatsoever, traditional glass forming techniques generally sufficing, e.g. batching and fusing raw materials, then quenching the melt to form a homogeneous glass. Such techniques are well known in the art.

Any "phosphate" glass can be joined by the invention. Generally, such glasses include any which contain at least about 20 mol % ($P_2O_5$ basis), preferably at least about 30–75 mol %, and most preferably at least about 35–68%. Up to about 80 mol % can be used, but preferably less than about 75 mol %, most preferably less or equal to about 68 mol %. Essentially any other conventional component in phosphate glasses can also be contained in conventional amounts. Several such compositions are illustrated by way of example in Table 1 which follows.

Such glasses are very well known, e.g. from U.S. Pat. Nos. 4,075,120, 4,108,673, 4,239,645, 4,248,732, 4,406,681, 4,661,284, 4,770,811, 4,820,662, 4,929,387, 5,032,315, 5,039,631, 5,334,559 and 5,491,708, 5,508,235, 5,526,389, and from the literature—*Inorganic Glass-Forming Systems*, N. J. Kreidl *Glass Science and Technology*, Volume 1 p. 107 et seq., *Spectroscopic Properties of $Nd^{3+}$ Dopant Ions in Phosphate Laser Glasses*, S. A. Payne et al. *Ceramic Transactions—Solid State Optical Materials*, 1992 Volume 28 p. 253 et seq., *Thermal-Mechanical and Physical-Chemical Properties of Phosphate Laser Glasses*, M. L. Elder et al., *Ceramic Transactions—Solid State Optical Materials*, 1992 Volume 28 p. 261, *Effect of Phosphate Glass Composition on the Rate of Platinum Dissolution*, *Ceramic Transactions—Solid State Optical Materials*, 1992 Volume 28 p. 283 et seq., each of which is incorporated by reference as if fully set forth in this application.

Particularly preferred compositional spaces are shown in Table 1.

TABLE 1

Compositional Space for Phosphate Glass

| Oxide Component | Mol % Range | Mol % Range Preferred | Mol % Range Particularly Preferred |
|---|---|---|---|
| $SiO_2$ | 0–20 | 0–15 | 0–12 |
| $P_2O_5$ | 25–80 | 30–75 | 35–68 |
| $B_2O_3$ | 0–20 | 0–15 | 0–12 |
| $Al_2O_3$ | 2–20 | 3–15 | 4–15 |
| $Re_2O_3$ | 0–15 | 0–12 | 0–10 |
| $La_2O_3$ | 0–15 | 0–12 | 0–10 |
| $Li_2O$ | 0–40 | 0–38 | 0–35 |
| $Na_2O$ | 0–40 | 0–38 | 0–35 |
| $K_2O$ | 0–40 | 0–38 | 0–35 |
| $Rb_2O$ | 0–40 | 0–38 | 0–35 |
| $Os_2O$ | 0–40 | 0–38 | 0–35 |
| $Ag_2O$ | 0–30 | 0–28 | 0–25 |
| $MgO$ | 0–40 | 0–35 | 0–30 |
| $CaO$ | 0–40 | 0–35 | 0–30 |
| $SrO$ | 0–40 | 0–35 | 0–30 |
| $BaO$ | 0–40 | 0–35 | 0–30 |
| $ZnO$ | 0–40 | 0–35 | 0–30 |
| $TiO_2$ | 0–3 | 0–3 | 0–3 |
| $ZrO_2$ | 0–3 | 0–3 | 0–3 |
| $SnO_2$ | 0–3 | 0–3 | 0–3 |
| $Nb_2O_5$ | 0–20 | 0–15 | 0–10 |
| $Ta_2O_3$ | 0–7 | 0–7 | 0–7 |
| $Y_2O_3$ | 0–15 | 0–10 | 0–7 |
| $Ce_2O_3$ | 0–15 | 0–12 | 0–10 |
| $Pr_2O_3$ | 0–15 | 0–12 | 0–10 |
| $Nd_2O_3$ | 0–15 | 0–12 | 0–10 |
| $Sm_2O_3$ | 0–15 | 0–12 | 0–10 |
| $Eu_2O_3$ | 0–15 | 0–12 | 0–10 |
| $Gd_2O_3$ | 0–15 | 0–12 | 0–10 |
| $Tb_2O_3$ | 0–15 | 0–12 | 0–10 |
| $Dy_2O_3$ | 0–15 | 0–12 | 0–10 |
| $Er_2O_3$ | 0–15 | 0–12 | 0–10 |
| $FeO$ | 0–10 | 0–8 | 0–5 |
| $CoO$ | 0–10 | 0–8 | 0–5 |
| $NiO$ | 0–10 | 0–8 | 0–5 |
| $CuO$ | 0–5 | 0–4 | 0–3 |
| $MnO_2$ | 0–3 | 0–3 | 0–3 |
| $V_2O_5$ | 0–5 | 0–5 | 0–5 |
| $Cr_2O_3$ | 0–0.3 | 0–0.2 | 0–0.15 |
| $As_2O_3$ | 0–5 | 0–5 | 0–5 |
| $Sb_2O_3$ | 0–5 | 0–5 | 0–5 |

The glasses can be of the same or different compositions. It is preferred that both glasses be phosphate glass, but bonds may be made with other glasses and ceramics if the conditions and solutions are chosen correctly. Substrate shapes are not critical. However, flat surfaces with minimal surface figures are preferred. Substrate thicknesses are also not critical. Similarly, joined surface area is not critical, although the configuration should be chosen with care such that the exit path for the aqueous portion of the solution is minimized, leading to better dehydration of the joint during curing. For example, samples of preferably annealed glass can be prepared into discs (e.g. 25 mm in diameter by 5 mm thick) which are then preferentially ground and polished on the one side of each sample intended for joining.

Also by way of non-limiting example, discs of both active (lasing) and passive (non-lasing) IOG-1 phosphate laser glasses (commercially available glasses procurable from Schott Glass Technologies, Duryea, Pa. 18642) are obtained. Such glasses are prepared following the basic disclosure of commonly assigned U.S. Pat. No. 5,334,559, which is incorporated herein in its entirety.

The glasses are then joined at room temperature using a phosphorus-containing solution as the liquid joining agent according to the method more completely described hereinafter and by way of the non-limiting examples.

The surface intended for joining is preferably prepared with a good surface figure, e.g. less than 500 nm (peak to valley), preferably equal to or less than 200 nm (peak to valley). Larger surface figures may be acceptable when the end use application is appropriate, e.g. the larger the surface figure typically the less strong, chemically durable, and transparent the bond is likely to be. The surface should also have a good polish to it, e.g. an inspection-quality transparent polish.

The joining surfaces are preferably cleaned prior to joining, where bond strength and/or optical transparency are important, as is usual. Various aqueous and non-aqueous solutions may be used to remove hydrocarbon and/or particulate debris. The following solutions are suitable for such cleaning, e.g. ethanol, methanol, potassium hydroxide solution, Micro™ cleaning solution (available from Cole Palmer Instrument Co, Vernon Hills, Ill. 60061), deionized water, Branson GP ultrasonic cleaning solution (available from Branson, Danbury Conn. 06810), among many others.

Each joining surface should be preferably cleaned for a time period ranging from 1 to 60 min, more preferably at least 30 minutes or whatever time suffices routinely for external cleaning. Cleaning may be conducted by immersing the glass into one of the aforementioned cleaning solutions, and agitating the solution with a Branson 3200 ultrasonic cleaner (also available from Branson, Danbury, Conn. 06810).

The standard cleaning regimen utilized in each of the examples of this application comprises the following steps:

rinse the component in deionized water
place the component in Micro™ solution in an ultrasonic cleaner for 20 minutes
rinse the component with deionized water
place in 3.0 M KoH solution for 30 seconds (varies depending on chemical durability of the glass)
rinse with deionized water
rinse with ethanol
rinse with methanol
dry with ultra high purity nitrogen gas
remove particles with $CO_2$ snow gun.

After the final cleaning stage, the samples are preferably stored in a dust free environment (beneath a clean glass enclosure or preferably a clean room environment) and allowed to dry. A clean room or laminar flow hood Is recommended to prevent foreign material depositing upon the surfaces to be joined.

Once the joining surfaces are clean and dry, phosphorus-containing solution should be applied to one or both of the joining surfaces. In general terms, for applying manually, application quantity should be in the range of 0.1 to 1000 microliters per square centimeter, 0.1 to 2.0 microliters per square centimeter is preferred. If dip-coating is the chosen application method, the remaining solution will depend on the viscosity and surface tension of the liquid and the pressure applied to the components during joining. It is preferred to minimize the amount of solution used while still adequately covering the joint, thereby reducing curing time and joint thickness.

The phosphorus-containing solution is preferably aqueous-based and is preferably prepared by mixing one or more soluble phosphorus containing raw materials with preferably deionized water, such that the $P_2O_5$ content (calculated) in solution is effective to join the surfaces according to the invention. Typically, about 0.1 to 85 weight % ($P_2O_5$) can be used preferably less than or equal to 30 weight %, more preferably less than or equal to about 20 weight %. Most preferably the amount is about from 10 to 20 weight %.

The phosphorus-containing solution can be acidic (pH<7.0), neutral (pH=7.0) or basic (pH>7.0) depending on which raw material and any other component which is used to prepare the solution. In a preferred embodiment, the solution is acidic, utilizing dilute phosphoric acid.

Furthermore, the solution in another embodiment is basic and can contain alkali and/or alkaline earth elements—e.g. where sodium phosphate glasses were to be joined, one would preferably use a soluble sodium phosphate salt. This would mimic the composition of the glass to provide a better interface. Colloidal $Al_2O_3$ may be added to more closely match the glass composition and to provide a more durable joint. Generally, any component compatible with the glass substrate can be added to the phosphorus-containing solution.

Other components may be added to enhance solubility of the components of the solution, e.g. hydrochloric acid or the like to ensure a more dissolved solution.

Table II lists one general composition of the phosphorus-containing solution suitable for use for joining phosphate glasses at room temperature.

TABLE II

Preferred Compositional Space for the Phosphorus-Containing System

| Oxide Component | Weight % | Preferred Weight % | Particularly Preferred Weight % |
| --- | --- | --- | --- |
| $H_2O$ | 15–99.9 | 50–90 | 70–90 |
| $P_2O_5$ | 0.1–85 | 5–35 | 10–30 |
| $Al_2O_3$ | 0–10 | 0–5 | 0 |
| $Li_2O$ | 0–15 | 0 | 0 |
| $Na_2O$ | 0–20 | 1–20 | 1–20 |
| $K_2O$ | 0–25 | 1–20 | 0 |
| MgO | 0–10 | 0 | 0 |
| CaO | 0–10 | 0 | 0 |
| BaO | 0–10 | 0 | 0 |
| SrO | 0–10 | 0 | 0 |
| $SiO_2$ | 0–27 | 0–15 | 0–8 |

Typical raw materials used to prepare phosphorus-containing solutions include deionized water, NaOH, HCl, 85 weight % phosphoric acid, $P_2O_5$, hydrated or anhydrous alkali phosphate salts (i.e., $K_2HPO_4$, $KH_2PO_4$, $KPO_3$, $Na_2HPO_4$, $LiPO_3$, colloidal $Al_2O_3$ suspension), salts of the mentioned compounds, and other suitable similar phosphorus containing substances that are soluble in the solution, and all are generally commercially available.

The phosphorus-containing solution should preferably be applied onto the joining surface using a pipette or by dip coating. However, any method commonly used to dispense liquid could be employed for this step in the joining process, e.g. aerosol dispensing, pouring, dispersing, spraying under water, joining in a bath of phosphorous-containing solution, etc.

The joining surfaces on two separate discs or other shaped surfaces are then brought into contact to sandwich the phosphorus containing solution between the bonding surfaces. Upon contact, the solution should spread across each of the glass surfaces and form a homogeneous interlayer. If bubbles form, they may be removed by the application of a vacuum.

After the liquid interlayer is formed, the joint assembly "cures" and hardens, typically for 3 to 7 days at room temperature (22–27° C.). If a heat treatment is applied, the joint may cure for as little as three days or less, but the minimum time should allow the majority of water to evaporate prior to heat treatment. The joint assembly may, if desired, be placed under an external compressive force and/or vacuum to accelerate the joining process and/or to promote good joining in situations where din sheets or lightweight glass pieces are being joined. To accelerate curing, higher temperatures can be used if desired, up to less than the glass transition temperature of the lowest glass transition temperature component of the joint. A rigid joint is usually formed after 3 to 7 days of curing, longer periods of time may be used to further set the joint.

After sufficient room temperature curing, the joint should be strong enough to be subjected to oil based cutting, grinding and polishing without fracture. The joint in another embodiment after curing may be subjected to an additional heat treatment at a temperature below the glass transition temperature of the particular phosphate glass, e.g. typically ranging from 50° C. to 500° C. The heat treatment further strengthens and cures the joint, enabling it to be cut and polished in aqueous environments without failure at the joint interface.

In another embodiment, the joined glass may be heated to a temperature above the glass transition point of the glasses being joined, but this is not necessary to obtain the benefits of the invention.

Temperatures commensurate with those utilized in post processing are particularly preferred. A preferred heat treatment is between 350° C. and 400° C., particularly preferred is 375° C., especially when further processing of the hybrid substrate requires an ion exchange treatment in, e.g., a $KNO_3$ bath. Ion exchange in a $KNO_3$ bath is usually conducted at or about 375° C. It is preferred that the lowest possible temperature be used during heat treatment to minimize residual stress and birefringence at the joint interface caused by the difference in the coefficient of thermal expansion of the two glasses (if applicable). For reduction of thermal stresses, a room temperature cure is preferred if the standard operating temperature of the finished device is to be room temperature and if sufficient strength and optical performance is realized without heat treatment.

In a preferred method of fabricating photonic devices, the novel method of joining phosphate glasses is used to provide a hybrid glass preform. This preform is then further processed into thin sections or other shapes for the ultimate end use in a photonic device. Ideally the performance of the photonic device is improved by use of the hybrid glass over a monolithic glass. The template can be of any shape or size (as determined by the specific application).

The typical thickness of the joint interface is usually dependant on the starting surface figure of the joining surfaces i.e., materials with poor surface figure or with surface irregularities will have a thicker joint interfaces, while conversely those with good surface figure will have thinner joint interfaces. In general, the flatter the surface before joining, and thinner the resulting joint, the better the optical quality. Thus, for many optical applications a joint with an interface thickness of <500 nm is preferred. Such a joint can be formed between two polished joining surfaces, if those surfaces had a surface figure of ~200 nm (peak to valley) prior to joining. However, any joint thickness suitable for a given application is included. At least one of the glass components must be phosphate glass. Preferably, both are phosphate glass.

The examples which follow are to illustrate the invention and are not meant by way of limitation thereto.

EXAMPLE 1

An active lasing phosphate glass composite is fabricated using the following method. The active glasses are prepared according to the method of U.S. Pat. No. 5,334,559, with the following compositions:

| Active Glass (i.e. with Lasing Capabilities) Composition | |
|---|---|
| Oxide Component | Weight % |
| $P_2O_5$ | 68.16 |
| $Al_2O_3$ | 10.61 |
| $La_2O_3$ | 0.42 |
| $Na_2O$ | 11.91 |
| $Er_2O_3$ | 1.74 |
| $Yb_2O_3$ | 7.16 |

The components are prepared in 25 mm diameter disc shapes of 5 mm thickness. Each is polished on one of their flat surfaces to a surface figure less than 200 nanometers.

The glass discs were then cleaned in an abbreviated cleaning procedure, as follows:
- rub with methanol and clean wipe
- rinse with deionized water
- 10 minutes ultrasonic cleaning in Micro™ cleaning solution
- rinse with deionized water
- immerse for 30 seconds in 3.0 molar potassium hydroxide (KOH) solution
- rinse with deionized water
- rinse with ethanol
- rinse with methanol.

Then 0.25 microliters per square centimeter of an about 20 weight % $P_2O_5$ solution were applied to the polished surface of one glass disc. The solution was prepared from a commercially available phosphoric acid, which is 85 weight percent $H_3PO_4$. The phosphoric acid was diluted with ionized water to a concentration which contained 20 weight % $P_2O_5$ (calculated on a weight basis). The solution was then agitated by hand, as the components were easily miscible. The thoroughly mixed solution was then filtered through a 0.2 micron polycarbonate filter. The filtered solution was centrifuged at an appropriate speed for about 5 minutes to remove any particulates, The centrifuged solution was then transferred to a new container to remove any sludge or particles in the centrifuged container. The filtered, centrifuged solution was then kept in a clean box until ready for use. A pipette was used to dispense the appropriate amounts (i.e. 0.25 μl/cm$^2$) onto the glass surface.

The second glass disc was then brought into contact from above in a laboratory environment (i.e. not within a clean room). Once the solution was sandwiched between the two polished surfaces, the discs were then translated relative to each other to remove bubbles from the joint The components were then cured at room temperature for seven days. A rigid joint (which could not be broken by hand) was formed. The joint was examined by scanning electron microscope (SEM) in the following manner. The active to active joint was cut and polished in oil (Beuhler lapping oil) and coated with carbon. The exposed joint was then analyzed by SEM to result in FIG. 1, which shows the uniform and thin (<500 nm) interface that was formed when phosphate glasses were prepared and joined as described above.

Figure 2:
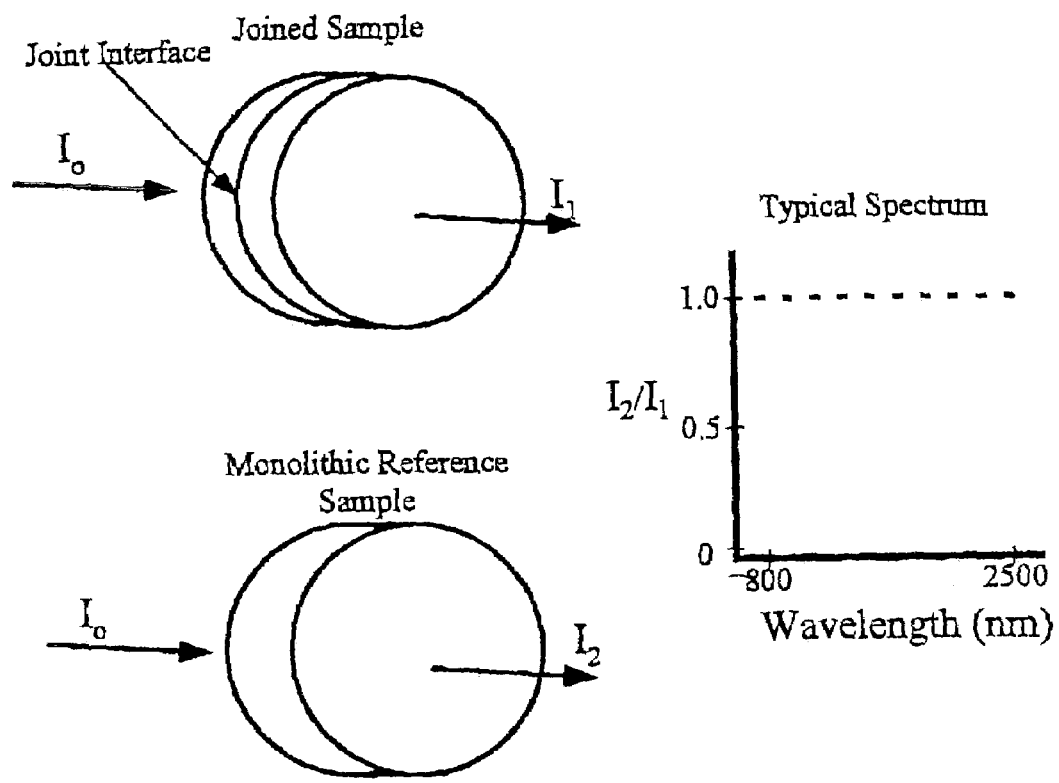
FIG. 2 is a graphical representation of a transmittance test for a joined composite or hybrid according to the instant invention.

The percent transmittance of the joined material was measured using a Perkin Elmer, Lambda-9UV/VIS/NIR spectrometer (available from Perkin Elmer Corporation, Norwalk, Conn. 06856). Radiation of 1300 nanometer wavelength was directed into the composite material and a reference monolithic sample as illustrated in FIG. 2. The percent transmittance is calculated using the following formula:

$$\%T = I/I_0 \times 100$$

where I is the transmitted tight intensity, and $I_0$ is the incident light intensity.

This method can be used to compare the relative transmittance (from at least 800 to 2500 nm) between an unjoined reference sample and a sample that had a joint perpendicular to the measurement direction.

The transmittance, at 1300 nm, of the active to active bonded phosphate glass was measured to be 92.1%. The monolithic reference sample was measured to be 92.2%.

About an 8% loss of transmission occurs at the air to phosphate glass interfaces of both the reference monolithic sample and the joined phosphate glass due to the difference in refractive index of air and glass). Thus, only about 0.1% loss of transmittance may be attributable to the joint (which is approximately the accuracy of the measuring equipment).

The percent loss in transmittance from a non-absorbing glass with flat, parallel, polished surfaces can be calculated using Equation (1):

$$R = \frac{2 \cdot n}{(n^2 + 1)} \times 100 \qquad (1)$$

where R is the percent of incident light that is reflected and n is the refractive index of the glass at the wavelength of interest (i.e., 1300 nm).

The phosphate glass had a nominal refractive index of 1.513±0.003 at 1300 nm, which corresponds to a loss in transmittance (R) ranging from 7.9 to 8.1 (which accounts for the about 8% loss in transmittance through each sample). The small 0.1% deviation in percent transmittance between the joined (92.1% transmittance) and monolithic (92.2% transmittance) samples may be attributable to the loss at the joint interface. This 0.1% deviation in percent transmittance is near the accuracy of the Lambda-9 spectrometer, and only accounts for a loss of <0.01 dB. This small <0.01 dB loss is considered acceptable for photonic applications, since such a loss only occurs at one point (at the interface) and not throughout the entire photonic device.

EXAMPLE 2

An active and passive phosphate glass are joined in the following manner. The active glass has the composition as noted in example 1, and is prepared in the same way as in example 1. The configuration of the active component was in a parallelepiped with a height of 17 mm, a width of 20 mm, and a length of 50 mm. The passive glass was formed in the same manner, with the composition below:

| Passive Glass (i.e with no Lasing Capabilities) Composition | |
|---|---|
| Oxide | Weight % |
| P2O5 | 69.20 |
| Al2O3 | 10.77 |
| La2O3 | 7.94 |
| Na2O | 12.09 |
| Er2O3 | 0 |
| Yb2O3 | 0 |

The passive glass was also a parallelepiped having a height of 33 mm, and a width and length matched to that of the active glass. The glasses were polished as per example 1 and cleaned in a similar manner, except that they were ultrasonically cleaned for 20 minutes in the Micro™ solution.

Then, in a clean box (dust-free polymeric enclosure); 0.3 microliters per square centimeter of phosphorus-containing solution were applied to the active glass polished surface. The passive glass polished surface was then brought into contact with the active glass polished surface to sandwich the phosphorus-containing solution between the two glasses and the joint assembly was placed into a vacuum dessicator to remove bubbles from the interface.

After the joint had cured for three days, a heat treatment was applied to the joined sample. The joined sample was gradually (60° C. per hour) heated from room temperature to 70° C. and maintained there for 20 hours. The joined sample was then raised in temperature gradually (5° C. per hour) to 150° C., where it was held for 5 hours. The joined sample was then raised in temperature gradually (20° C. per hour) to 375° C., where it was held for 5 hours. The sample was then gradually (60° C. per hour) cooled to room temperature.

This sample could be, and was, cut using water-based cutting. Plates 2 mm in thickness were cut from one side such that the plates were 50 mm tall, 50 mm wide, and 2 mm thick. The plates also survived water-based polishing. Utilizing the same percent transmittance method as for Example 1, the transmittance of the cut and polished active-passive sample was 92.2%, the same as the monolithic sample of example 1.

The joined samples had the same transmittance characteristics as the monolithic reference sample. Thus, when prepared according to the instant invention, the interface is optically transparent (at least to the measurement capabilities of the Lambda -9 spectrometer) in at least the 800 to 2500 nm spectral range, and especially at the 1300 nm range, a common telecommunications wavelength.

On average, depending on measurement method and preparation method to prepare the novel joints, a loss of between 0.1 to 0.3% of transmission may be expected. This is such a low loss that for most applications, including lasers and telecommunications, it is a virtually lossless connection.

Turning now to a more detailed nonlimiting theoretical discussion of the invention, it is noted that an aqueous phosphorus-containing solution can be used to form an optically transparent and mechanically strong joint between phosphate glasses at room temperature and/or by following the room temperature cure with an appropriate heat treatment. Hybrid photonic devices may be formed by the present method, the devices containing sections of phosphate glass with variable compositions can be joined in such a way that they are optically transparent.

As discussed above, two or more chemically similar or chemically distinct phosphate glasses within the general compositional space outlined in Table I may be finely ground or polished on at least one surface. Other glasses or optical components also may be used, but phosphate glass is preferred. Each ground or polished surface is then cleaned sufficiently to remove hydrocarbon contamination and/or particulate debris and to prepare two clean, hydrophilic surfaces, which can be joined through glass dissolution and condensation reactions, as described below.

Once the two joining surfaces are cleaned, a small volume of phosphorus-containing solution (of the general composition shown in Table II, with any appropriate combination of the listed or other components) is applied to the surface of one or both of the glasses. The two joining surfaces are then brought into contact and maintained there, such that the phosphorus-containing solution is sandwiched between the two glasses, until the joint is formed.

Although the applicants believe what follows to be the mechanism through which the bonding process occurs, they offer the explanations contained herein by way of theoretical explanation and do not wish to be bound by the theory.

Dissolution reactions are believed to ensue once the solution comes into contact with the two glass surfaces, since phosphate glasses, e.g., with the general composition listed in Table I, are soluble in aqueous solution, especially when the pH is greater than or less than 7. As the glass begins to dissolve, the concentration of phosphorus species (i.e., $PO_4^{3-}$, $HPO_4^{2-}$, $H_2PO_4^-$, and $H_3PO_4$) in the interfacial region begins to increase.

Figure 3:
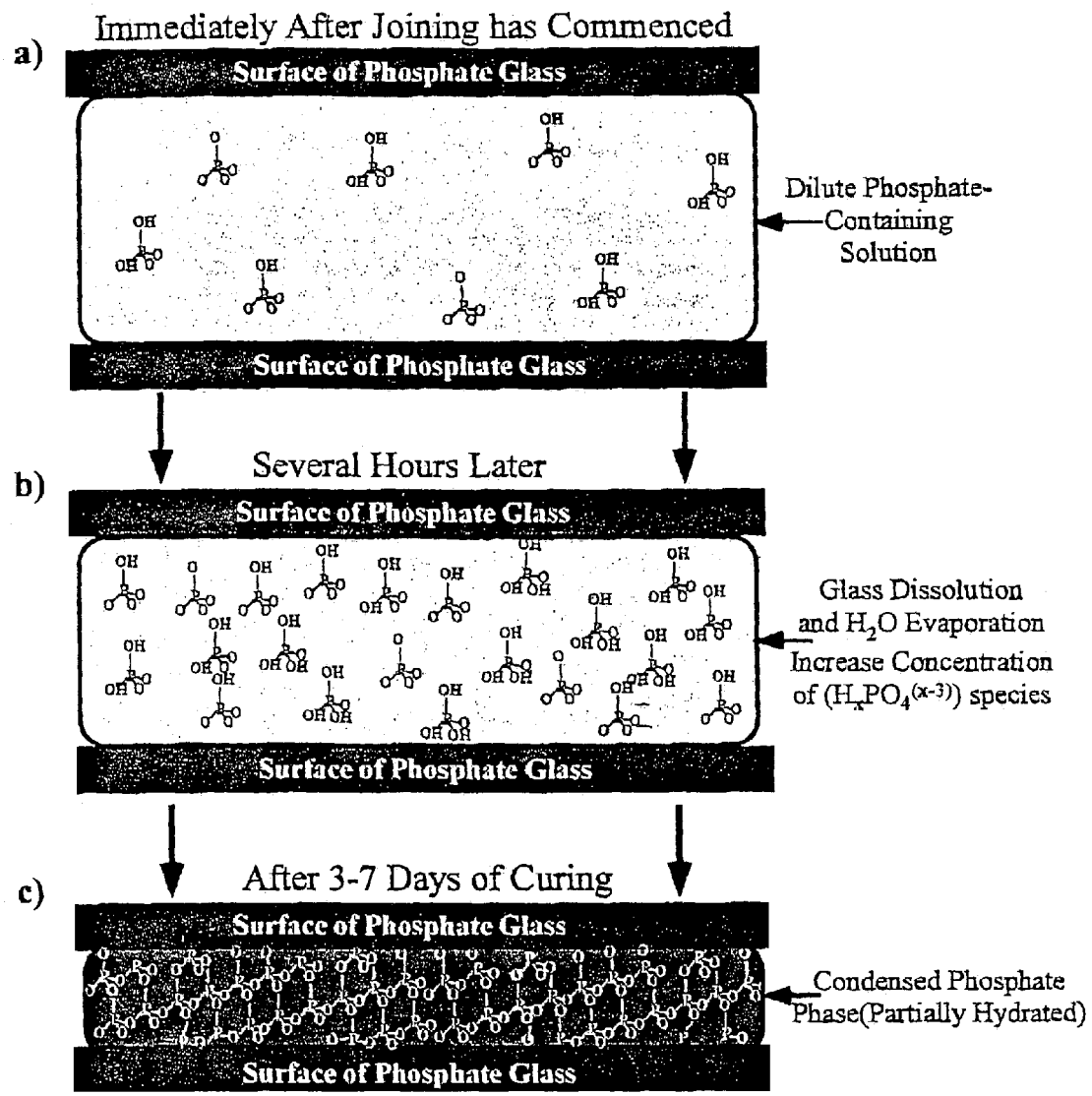
FIG. 3 illustrates a nonlimiting theoretical reaction mechanism whereby the inventive novel joint is formed.

FIG. 3 illustrates a theoretical reaction mechanism whereby the inventive novel joint is formed. Turning to the phase labeled "a" it may be seen that when the concentration of phosphorus species in the phosphorus-containing joining solution is low, it is believed that the majority exist as $H_xPO_4^{(x-3)}$ monomers (i.e. in the dilute phase, e.g. of phosphoric acid or the like, when mixed with the appropriate preferably aqueous carrier).

However, it is believed that as the concentration of phosphorus species is increased as seen in phase "b" (from glass dissolution and evaporation of $H_2O$ from the interfacial region), condensation reactions convert the $H_xPO_4^{(x-3)}$ monomers into —P—O—P—O—P— chains, as illustrated in the phase marked with reference "b". A rigid, condensed phosphate phase is formed at the interface, as illustrated in the phase marked "c", once the P—O—P cross-linking proliferates to the two glass surfaces. The (P—O—P)n cross linking can occur over wide approximate values of n, e.g. high values of 1,000,000, 500,000, and low values of 2, 10, 100, and 1000.

This condensed phosphate interface is responsible for the chemical bonding at the joint interface. The rigidity of the condensed phosphorus phase (and consequently the strength of the joint) is enhanced during the curing as $H_2O$ evaporates from the interface or diffuses into the adjacent glass surfaces, and the cross-linking within the interfacial region is increased.

The phosphate glass joints formed by this novel process are considered rigid because they are not plastically deformed or fractured when subjected to oil-based cutting, grinding and polishing. However, excessive amounts of residual water remaining in the condensed phosphorus could result in a semi-rigid joint that could undergo plastic deformation.

A semi-rigid joint can be avoided by utilizing longer curing times, application of a vacuum, and/or by subjecting the joint to a post-curing heat treatment at a temperature >25° C., but below the glass transition temperature of the glass in the joint having the lowest glass transition temperature. A suitable range is from about 70° to about 550° C., preferably from about 200° C. to about 500° C., more preferably from about 300° C. to about 400° C. A particularly preferred heat treatment is at a temperature of about 375° C. However, any suitable temperature consistent with being below the glass transition temperature of the components of the hybrid or joined same-type glasses may be used. It is preferred to heat treat at a temperature consistent with any post-processing of the optical components as in ion exchange or other processing, which occurs at higher temperatures (e.g. about 375° C.).

The instant inventive joined glass finds many uses, especially where a low-loss joint is essential. By way of example, joined phosphate glasses according to the instant invention are suitable as substrates for multiple wavelength arrays.

For example, a phosphorus-containing solution can be used to join an active phosphate laser glass (i.e., a glass with the general composition in Table I that contains >0.05 wt % of a rare earth oxide, other than $La_2O_3$) with a passive glass (i.e. a glass with the general composition in Table I, where $La_2O_3$ is the only rare earth oxide incorporated into the glass or no rare earth or lasing ions are included at all).

Such substrates are additionally suitable for use in the fabrication of multiple-wavelength arrays for telecommunication sources and measurement tools for optical fiber systems by virtue of their extremely low loss characteristics and multiple wavelengths.

Figure 4:
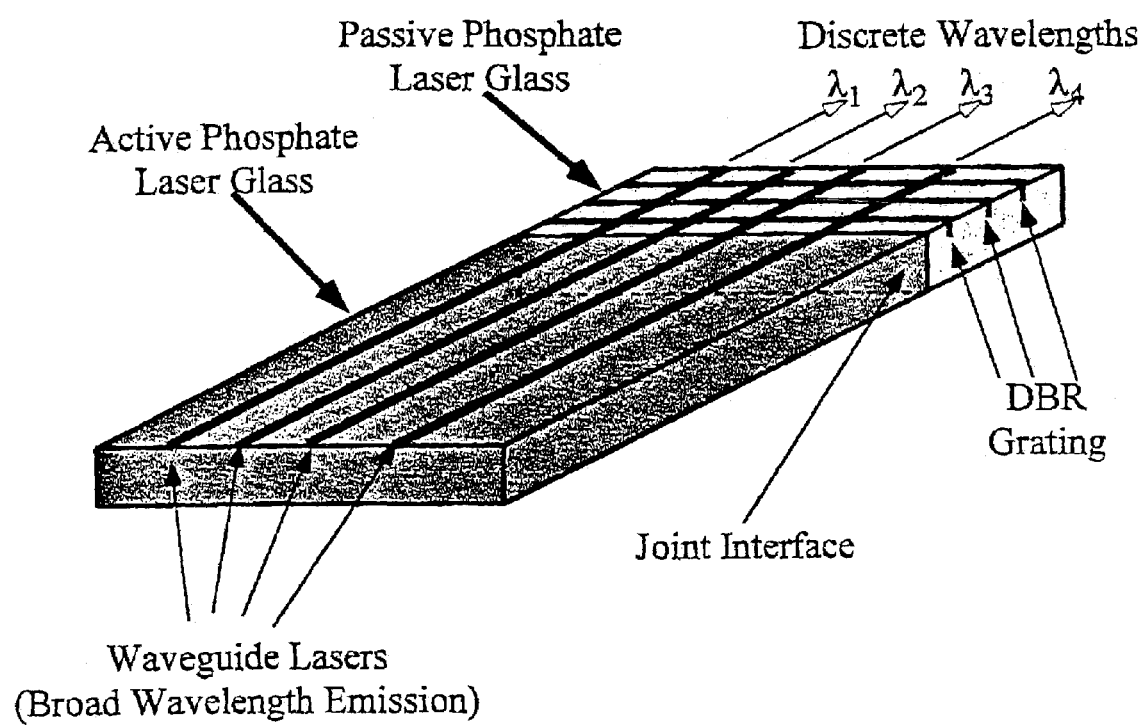
FIG. 4 is a perspective view of an exemplary waveguide laser array constructed from a hybrid glass substrate prepared according to the instant invention.

A pictorial representation of a multiple wavelength array that could be fabricated from a hybrid glass substrate is shown in FIG. 4. The active portion of the substrate acts as a broad-band laser, and the passive portion acts as a distributed-Bragg-reflector (DBR) grating, which allows for wavelength selectivity. Preferred wavelengths which can be emitted are in the 1540 nm and 1300 nm telecom windows.

In another preferred use, a laser source fabricated using the inventive joint can also be designed to simultaneously produce the multiple wavelengths necessary for dense wave division multiplexing (DWDM) systems and components operable at telecommunications wavelengths, e.g. the 1540 and 1300 nm telecom windows. In this arrangement, one laser may produce several wavelengths.

These and other uses of the novel joined glasses are now possible in telecommunications (e.g fiber optic, laser, optical networking, etc) applications and one skilled in the art may now realize other uses while having regard for this disclosure.

Some exemplary networks and uses are described in *Optical Fiber Telecommunications II*, S. E. Miller et al., Academic Press, Inc., London (1988); *Multiwavelength Optical Networks*, T. F. Stem et al., Addison Wesley Longman, Inc., Reading, Mass. USA (1999); and *Fundamentals of Photonics*, B. E. A. Salch et al., John Wiley & Sons, Inc., New York, N.Y., USA (1991).

Furthermore, the novel joining or bonding method can be used to prepare joints in an economical manner between active and passive phosphate laser glass which provides sufficient mechanical strength, low loss (<0.01 dB) and minimal birefringence at the interface. The novel low temperature joining process is very cost effective because one large hybrid glass preform can now be sectioned by oil-based or water-based cutting, grinding and polishing to prepare a multitude of substrates for use in photonic devices (e.g. multiple wavelength arrays) simply by cutting appropriate sizes from the preform.

Figure 5:
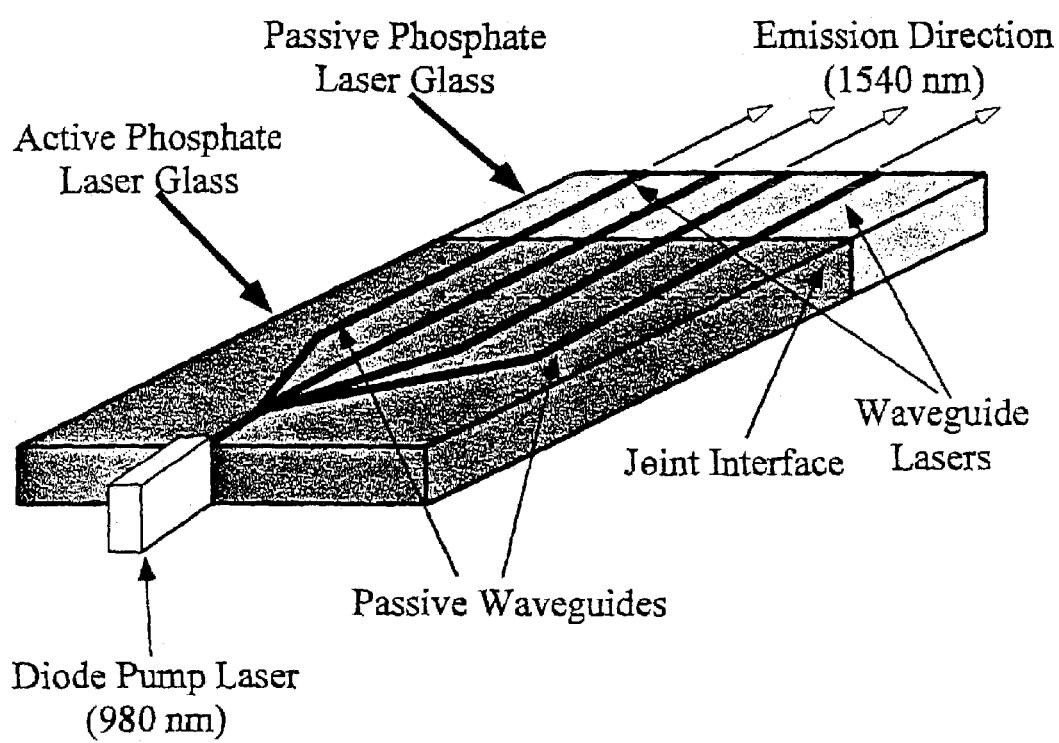
FIG. 5 is a perspective view of an exemplary array of lasers simultaneously pumped by a single laser diode fabricated on a hybrid laser glass substrate according to the present invention.

The novel joined composition now makes it possible to manufacture substrates for multiple waveguide lasers, all of which can be pumped by a single source. An active phosphate laser glass is joined to a passive phosphate laser glass in the novel manner according to the instant invention. Turning now to FIG. 5, the waveguide design illustrated there can be "written" onto the substrate (e.g. by ion exchange, metal diffusion, proton diffusion, or other suitable techniques) such that a single source of pump light focused onto the passive laser glass section could be guided to several waveguide lasers in the active section. This novel design allows multiple waveguide lasers within the active portion to be pumped simultaneously by a single source. A significant benefit accruing to this design is that the pumping light would not suffer appreciable absorption in the passive glass as it would in the active glass, since the passive phosphate glass is transparent at 980 nm (the wavelength typically used to pump an active Er/Yb doped phosphate laser glass).

This novel joining method provides a cost-effective method of preparing large hybrid glass substrates, having good mechanical strength, low loss (<0.01 dB) and minimal birefringence with ease of customization to a particular end use.

Figure 6:
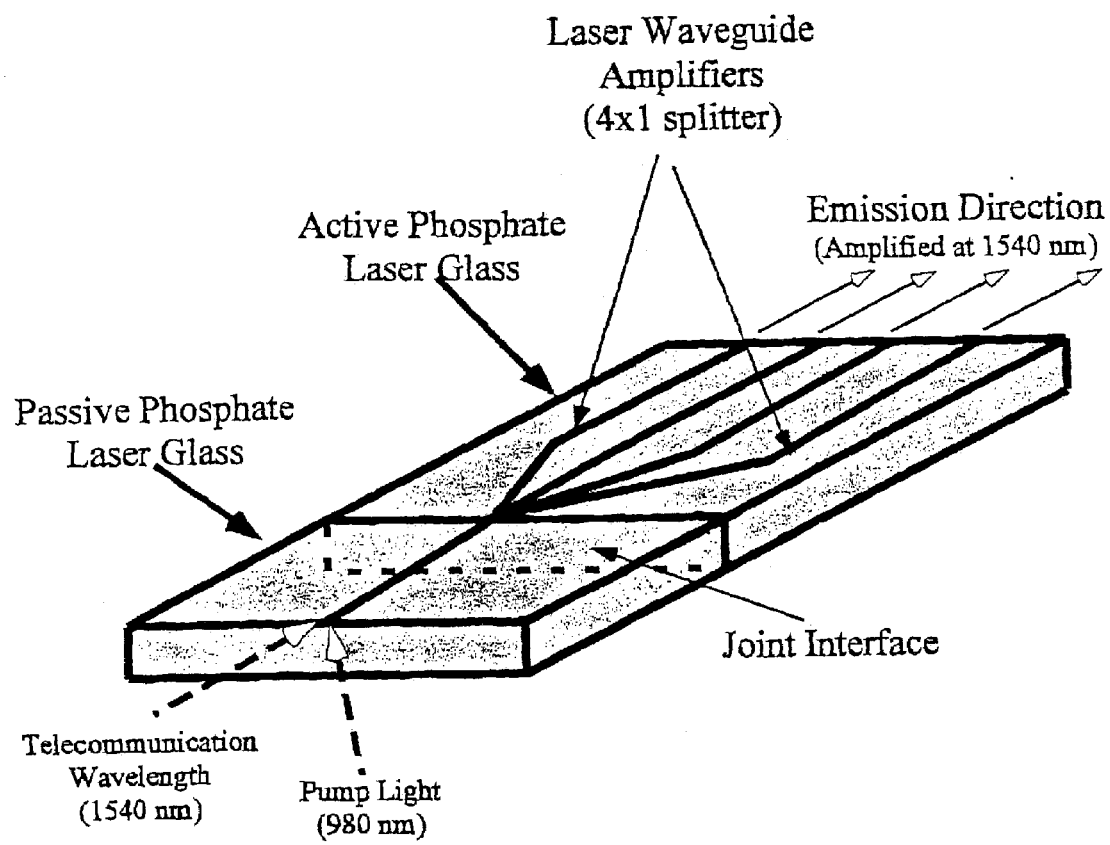
FIG. 6 is a perspective view of an exemplary 4×1 lossless splitter fabricated on a hybrid phosphate laser glass substrate according to the present invention.

The novel joined glasses also can function as substrates for lossless splitters. In this embodiment, an active phosphate laser glass is joined to a passive phosphate laser glass using the low temperature phosphate joining method. Digital photonic information carried within a single waveguide in the passive section is then split into several waveguides in the active section. Again, preferred wavelengths for this include about 1300 nm and 1540 nm. A pump laser is used to amplify the signal in the active section, as seen in FIG. 6, which illustrates an exemplary 4×1 lossless splitter, where the laser waveguide amplifiers are pumped in the longitudinal direction. The novel invention described herein provides for the nearly lossless splitting of broadband digital and cable television (CATV) information in the passive section. The final design of such splitting devices may differ from this exemplary embodiment.

Novel hybrid joints according to the instant invention also are suitable as substrates for self-cooling laser sources. In such laser sources according to the instant invention, successive sections of active and passive phosphate laser glass are joined by the low temperature phosphate glass bonding. These composites form a hybrid laser where the active sections participate in light amplification, and the passive sections transmit the light without amplification and provide a sufficient volume of non-lasing material for "self-cooling." This self-cooling system reduces thermal noise when a phosphate laser glass is used for high power applications. The laser is constructed utilizing the novel cost-effective method of preparing large hybrid glass substrates with good mechanical strength, low loss (about 0.01 dB at each interface) and minimal birefringence associated with room temperature phosphorus solution joining.

The present invention also contemplates a general hybrid photonic device where substrates composed of active to active, active to passive and passive to passive phosphate glass junctions provide enhanced performance over a monolithic system. The hybrid substrate formed according to the instant invention has suitable mechanical strength—such that it can be machined, ground and polished without fracture. The hybrid device is a good transmitter of light at usefull wavelengths for data intensive applications (i.e. good transmittance at 1300 or 1540 nm is provided for fiber optic telecommunication systems, but also has excellent transmittance between 800–2500 nm wavelengths). Finally, the interface between different sections of glass has minimal birefringence to minimize any loss of intensity or change in the polarization of light as it travels from one section of glass into another.

It should be noted that condensed phosphates, like the phase formed at the interface after room-temperature curing of the phosphorus-containing solution, are hygroscopic. Thus, for removal of all of the residual water from the interface of a joint, moderate heat treatment or vacuum desiccation is preferred. In a preferred embodiment discussed above, the joint may be heat treated at a temperature >25° C., to optimize mechanical strength, chemical durability, transmission, and machinability.

In yet another preferred embodiment, the joined glass in this foregoing application is at some point in time after the joint is finally cured and/or heat treated supplied with a waveguide, e.g. one which is ion exchanged onto the surface of the glass prior to use in any photonic device. The ion exchange process is typically conducted in a $KNO_3$ salt bath at 375° C., and the glass is slowly heated up to this temperature before waveguides are "written" onto the glass. This slow heating helps to avoid thermally shocking the high expansion phosphate glass and can be used as an addition to the curing process.

In yet another preferred embodiment, because of the hygroscopic nature of the interface, the joined non-heat-treated substrates are thereafter machined, ground and polished with an oil based lubricant. Furthermore, the resulting non-heat treated joint is preferably protected from the atmosphere with a thin layer of hydrophobic liquid, e.g. an oil or organic hydrophobic film.

Other, conventional aspects of the designs of these uses are commonly known and are disclosed in, e.g. Camy et al. in "Ion Exchanged Planar Lossless Splitter at 1.5 μm", Electronics Lett 32 [4]321 (1996) (which discloses a lossless splitter application; U.S. Pat. No. 5,669,997 to Robbert et al. (bonded optical or semiconductor members); U.S. Pat. No. 5,053,251 and U.S. Pat. No. 5,143,275 to Hara et al. (repairing glass-lined equipment); U.S. Pat. No. 3,409,198 to Peterman (a bonding apparatus).

In yet another aspect, the phosphorus-containing solution may be applied to a single piece of phosphate glass to provide a phosphorus treated surface of phosphate glass. Such glass may then, if desired be polished or have the surface prepared in any of a number of known ways while obtaining the benefits of the instant invention.

The entire disclosure of all applications, patents and publications cited above and throughout this application are hereby incorporated by reference.

The preceding examples can be repeated with similar success by substituting the generically or specifically described compositions, reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

While the invention has been described in connection with the preferred embodiment, it should be understood readily that the present invention is not limited to the disclosed embodiment. Rather, the present invention is intended to cover various equivalent arrangements and is only limited by the claims which follow.

Having described the invention as above, we claim:

1. A process for the formation of a phosphate-based glass composite, comprising:
    providing a first phosphate-based glass having a first surface and a second phosphate-based glass having a second surface,
    processing said first and second phosphate-based glass surfaces to provide a bonding surface,
    providing a solution containing a phosphorous compound,
    applying said phosphorus compound containing solution to at least one of said first and second phosphate-based glass surfaces,
    placing said first surface into contact with said second surface, and
    retaining said surfaces in contact until said surfaces are joined together while the solution cures.

2. A process as claimed in claim 1, further comprising heating the joined surfaces to a temperature below the glass transition temperature of the first or second phosphate-based glass surface.

3. A process as claimed in claim 1, wherein a vacuum is applied while the solution cures.

4. A process as claimed in claim 1, wherein the process is conducted at about room temperature.

5. A process as claimed in claim 1, wherein said step of processing said first and second phosphate-based glass surfaces comprises grinding or polishing.

6. A process as claimed in claim 5, wherein the resulting surface has a surface feature of less than 200 nm.

7. A process as claimed in claim 1, further comprising, after the step of processing, cleaning said first and second processed surfaces.

8. A process as claimed in claim 1, wherein pressure is applied to the phosphate-based glass surfaces.

9. A process as claimed in claim 1, wherein the temperature of the phosphate-based glass surface is gradually raised during the step of retaining.

10. A process of claim 1 wherein said solution consists essentially of water and a dissolved phosphorous compound therein.

11. A process of claim 1 wherein the process results in an optically transparent joint between the first and second phosphate-based glass surfaces.

* * * * *